United States Patent

[11] 3,622,128

| [72] | Inventor | Hans Geiser<br>CH-4914, Bruhlweg 23, Roggwil,<br>Switzerland |
|---|---|---|
| [21] | Appl. No. | 60,832 |
| [22] | Filed | Aug. 4, 1970 |
| [45] | Patented | Nov. 23, 1971 |
| [32] | Priority | Aug. 22, 1969 |
| [33] | | Switzerland |
| [31] | | 12744/69 |

[54] MIXING MEANS FOR LATERALLY CONVEYED RECEPTACLES
10 Claims, 3 Drawing Figs.

[52] U.S. Cl.............................................. 259/56,
259/DIG. 46, 259/75
[51] Int. Cl............................................. B01f 11/02
[50] Field of Search................................. 259/54, 56,
72, 75, DIG. 46, 91, 2, 1

[56] References Cited
UNITED STATES PATENTS
| 2,516,655 | 7/1950 | Smith ........................... | 259/75 |
| 2,774,803 | 12/1956 | Dreyfus ....................... | 259/DIG. 46 |
| 3,088,716 | 5/1963 | Stott ............................ | 259/DIG. 46 |

Primary Examiner—Robert W. Jenkins
Attorney—Lawrence E. Laubscher

ABSTRACT: Apparatus for mixing the contents of one or more receptacles during the lateral transport thereof by a horizontal conveyor, characterized by the provision of means for oscillating each receptacle about a vertical axis normal to the longitudinal axis of the conveyor. Each receptacle is carried by an oscillatory unit having receptacle support means and ferromagnetic armature means arranged above and below the conveyor member, respectively, said support and armature means being connected by a vertical axle that extends through a journal opening contained in the conveyor. Rotary drive shaft means mounted beneath and parallel with the conveyor member carry permanent magnet means that cooperate with the armature to effect the desired oscillatory movment of the unit. To maintain the contents at a desired temperature, the conveyor member, the oscillatory unit and at least the lower portion of each receptacle are submerged within temperature-modifying liquid contained in a nonferrous trough beneath which the magnetic drive shaft means are arranged.

FIG. I

INVENTOR.
Hans Geiser
BY
Lawrence E. Laubscher
ATTORNEY

MIXING MEANS FOR LATERALLY CONVEYED RECEPTACLES

This invention relates to improved mixing apparatus for mixing the contents of receptacles during the lateral transport thereof by a horizontal conveyor.

One drawback of the known mixing devices is the difficulty in achieving thorough mixing of the contents of a receptacle in the relatively short time required for certain analyzing or testing processes. Another problem is that of maintaining constant the temperature of the contents during handling and transport of the receptacles. The present invention was developed to avoid the above and other drawbacks of the known mixing apparatus.

Accordingly, the primary object of the present invention is to provide mixing apparatus for thoroughly mixing the contents of one or more receptacles during the lateral transport thereof on a horizontal conveyor, use being made of an oscillatory support unit that is journaled in the conveyor member. The support unit includes a ferromagnetic armature that is magnetically driven by permanent magnet means carried by rotary drive shaft means arranged beneath and parallel with the conveyor member.

According to a more specific object of the invention, a plurality of the oscillatory receptacle support units are connected with the conveyor in longitudinally spaced relation, said conveyor preferably being driven in a step-by-step manner. A plurality of permanent magnets is carried by the rotary drive shaft means in a similar longitudinally spaced manner corresponding with the mixing stations defined by the dwells that occur in the step-by-step transport of the conveyor.

A further object of the invention is to provide trough means that contain a temperature-modifying liquid in which the conveyor member, the oscillatory support unit and at least the lower portion of the receptacle are submerged. The bottom wall of the trough is formed of a nonferrous material, the rotary magnetic drive shaft means being mounted immediately beneath the trough.

According to another object of the invention, the oscillatory support unit includes receptacle support means and ferromagnetic armature means arranged above and below the conveyor, respectively, said means being connected by an axle journaled in a vertical bearing opening contained in the conveyor. Coil spring means bias the oscillatory support unit in a given direction of rotation relative to the conveyor.

Other objects and advantages of the invention will become apparent from a study of the following specification when viewed in the light of the accompanying drawing, in which.

Figure 1:
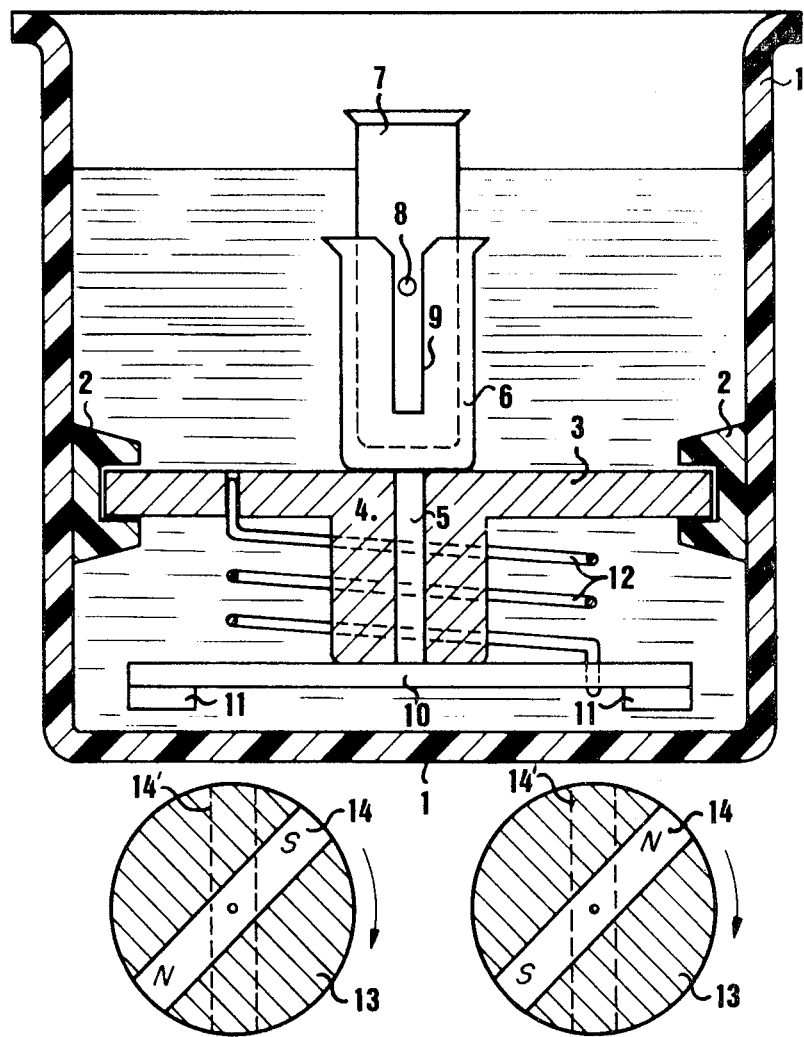
FIG. 1 is a transverse sectional view of the mixing apparatus.
Figure 2:
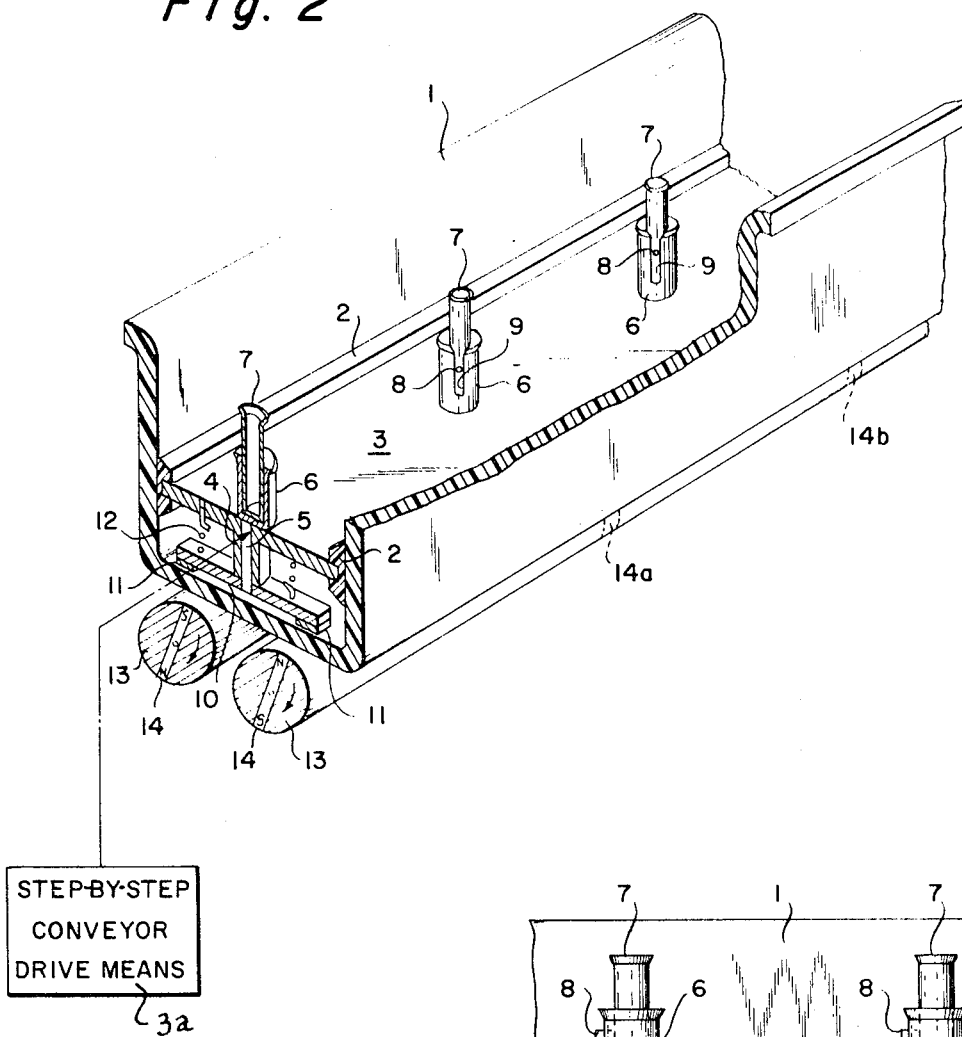
FIGS. 2 and 3 are detailed perspective and longitudinal sectional views, respectively, of the apparatus of FIG. 1.
Figure 3:
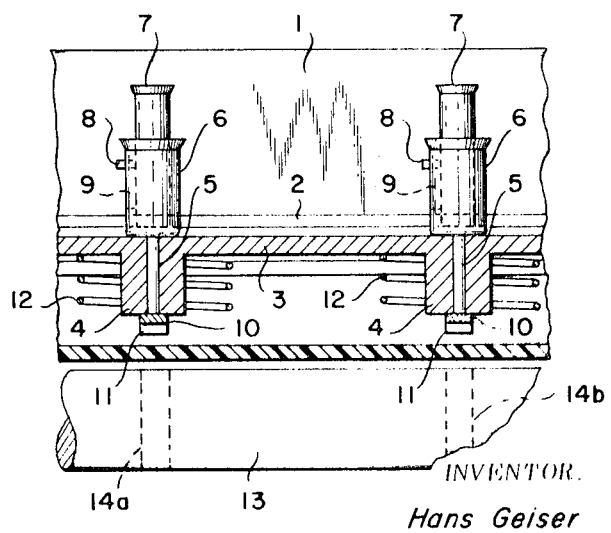

Referring to the drawing, the apparatus includes a trough 1 that is formed of a nonmagnetic material (for example, a synthetic plastic material) and includes on its inner surface a pair of guide tracks 2 that slidably receive a conveyor member 3. The conveyor member 3 is of rectangular cross section and generally consists of a horizontal plate or web that extends longitudinally of the trough. Preferably, the conveyor member 3 is displaced longitudinally in a step-by-step manner by conventional stepping means 3a.

At longitudinally spaced intervals, the conveyor member 3 is provided with bearing means 4 that contain vertical openings in which are journaled the axles 5 of receptacle support means 6. Consequently, the receptacle support means 6 are rotatably mounted for movement about vertical axes relative to the longitudinal axis of the conveyor member 3. Each receptacle support 6 is adapted to removably receive a receptacle 7 that contains the material to be mixed (usually a liquid). Rotational movement between the receptacle 7 and the receptacle support 6 is prevented by the pin and slot means 8 and 9, respectively. Preferably, the axes of the receptacle 7 and the axle 5 are colinear.

Rigidly connected with the lower end of the axle 5 is an armature 10 that is formed of a ferromagnetic material, which armature carries at opposite ends a pair of permanent magnets 11. As will be seen in the drawing, the armature 10 is supported immediately adjacent the bottom of the trough 1.

A helical spring 12 is arranged concentrically about each of the bearing means 4 for rotatably biasing in one direction relative to the vertical axis of the axle 5 the oscillatory unit consisting of the armature 10, the axle 5, the receptacle support 6, and the receptacle 7. The frequency of oscillation of the unit is preferably between 5 and 10 oscillation per second, the oscillation amplitudes being on the order of plus or minus 40 degrees. If desired, the receptacle 7 may be provided with one or more internal stirring paddles, not shown. In order to perform the aforementioned oscillations of the receptacle supports 6 about their vertical axes during longitudinal transport of the conveyor member 3 in a step-by-step manner, magnetic drive means are arranged longitudinally of the conveyor member beneath and immediately adjacent the nonmagnetic bottom surface of the trough 1. More particularly, the magnetic drive means comprise a pair of parallel drive shafts 13 that are formed of a suitable nonmagnetic material (such as aluminum), said shafts being provided with a plurality of longitudinally spaced, diametrically arranged permanent magnets 14. The spacing distance between the permanent magnets on each shaft 13 corresponds with the spacing distance between the mixing stations and the step-by-step travel of the conveyor member 3. Consequently, when the drive shafts 13 rotate at a given rotational velocity corresponding with he natural frequency of the oscillations of the armature 10, the magnetic forces between the magnets and the armature will be such as to effect the aforementioned oscillatory movement of the receptacle support means 6 and the accompanying receptacles 7. It is therefore possible to determine and mark those locations along the conveyor guide means 2 that a mixing and stirring operation will take place during the step-by-step longitudinal transport of the conveyor member by corresponding distribution of the permanent magnets 14 along the respective shafts 13.

While the preferred form and embodiment of the invention has been illustrated and described, it will be apparent to those skilled in the art that various changes and modifications may be made in the described apparatus. For example, a single drive shaft 13 equipped with the permanent magnets 14 may be provided, the armatures 10 being nonsymmetrically arranged relative to their axis of rotation, said armatures being provided with only a single magnet 11. Other modifications may be made without deviating from the inventive concept.

What is claimed is:

1. Apparatus for mixing the contents of a laterally conveyed receptacle, comprising
    conveyor means including a conveyor member (3) guided for longitudinal transport;
    an oscillatory support unit connected with said conveyor member for oscillatory movement about an axis normal to the longitudinal axis of said conveyor member, said unit including vertical receptacle support means (6) for supporting a receptacle (7) arranged coaxially therewith, and ferromagnetic armature means (10,11) connected with said receptacle support means; and
    drive magnet means (13,14) for magnetically operating said armature means to oscillate said receptacle support means relative to said conveyor member, whereby a receptacle carried by said support means is oscillated about its vertical axis during the lateral transport by said conveyor means.

2. Apparatus as defined in claim 1, wherein said conveyor member is generally horizontal; wherein said receptacle support means and said armature means are arranged above and below said conveyor member, respectively; and further wherein said conveyor member includes bearing means (4) containing a vertical opening; and further including a vertical axle (5) journaled in said bearing means and rigidly connected at its upper and lower ends with said receptacle support means and said armature, respectively.

3. Apparatus as defined in claim 2, wherein the axes of said receptacle support means and said axle are colinear.

4. Apparatus as defined in claim 2, wherein each of said drive magnet and armature means includes a permanent magnet; and further including rotatable drive shaft means (13) carrying said drive magnet means, said rotatable drive shaft means being arranged beneath said armature means and extending parallel with said conveyor member.

5. Apparatus as defined in claim 4, wherein the permanent magnets of said drive magnet means are arranged diametrically relative to said rotatable shaft means.

6. Apparatus as defined in claim 5, and further including a trough (1) containing a temperature-modifying liquid in which said conveyor means, said receptacle support means and said armature means are submerged, the bottom of said trough being formed of a nonferrous material, said drive shaft means being arranged beneath said trough.

7. Apparatus as defined in claim 6, wherein said armature means and said drive shaft means are arranged immediately adjacent the upper and lower surfaces, respectively, of the bottom wall of said trough.

8. Apparatus as defined in claim 2, and further including spring means (12) biasing said receptacle support means in one direction of rotation relative to said bearing means.

9. Apparatus as defined in claim 8, wherein a plurality of said oscillatory receptacle support means are connected with said conveyor member in longitudinally spaced relation; and further wherein a plurality of spring means bias said receptacle support means relative to said conveyor member, respectively, said spring means being such that the resulting oscillations of said receptacle support means have the same natural frequency.

10. Apparatus as defined in claim 9 wherein said conveyor means is operable in a step-by-step manner, and further wherein said drive shaft means supports a plurality of longitudinally spaced permanent drive magnets.

* * * * *